(12) United States Patent
Jones

(10) Patent No.: US 7,225,115 B2
(45) Date of Patent: May 29, 2007

(54) COORDINATING HAPTICS WITH VISUAL IMAGES IN A HUMAN-COMPUTER INTERFACE

(75) Inventor: Jake S. Jones, Antioch, TN (US)

(73) Assignee: Novint Technologies, Inc., Albuquerque, NM (US)

( * ) Notice: Subject to any disclaimer, the term of this patent is extended or adjusted under 35 U.S.C. 154(b) by 1022 days.

(21) Appl. No.: 09/971,379

(22) Filed: Oct. 4, 2001

(65) Prior Publication Data

US 2003/0100969 A1    May 29, 2003

(51) Int. Cl.
*G09G 5/00* (2006.01)
*G09G 5/08* (2006.01)
*G06G 7/66* (2006.01)
*G06F 17/16* (2006.01)

(52) U.S. Cl. ............... 703/7; 703/2; 345/156; 345/157

(58) Field of Classification Search ............ 703/2, 703/7; 715/702, 821; 710/72, 73; 708/130, 708/131; 345/619, 156, 157; 341/20, 22; 382/190, 199
See application file for complete search history.

(56) References Cited

U.S. PATENT DOCUMENTS

| | | |
|---|---|---|
| 5,296,871 A | 3/1994 | Paley |
| 5,436,638 A | 7/1995 | Bolas et al. |
| 5,459,382 A | 10/1995 | Jacobus et al. |
| 5,506,605 A | 4/1996 | Paley |
| 5,555,366 A | 9/1996 | Teig |
| 5,576,727 A | 11/1996 | Rosenberg et al. |
| 5,629,594 A | 5/1997 | Jacobus et al. |
| 5,714,977 A | 2/1998 | McNeil |
| 5,734,373 A | 3/1998 | Rosenberg et al. |
| 5,739,811 A | 4/1998 | Rosenberg et al. |

(Continued)

OTHER PUBLICATIONS

Salisbury, K. "Haptic Rendering: Programming Touch Interaction with Virtual Objects" Proc. 1995 Symposium Interactive 3D Graphics. 1995. pp. 123-130.*

(Continued)

*Primary Examiner*—Paul L. Rodriguez
*Assistant Examiner*—Ayal Sharon
(74) *Attorney, Agent, or Firm*—V. Gerald Grafe

(57) ABSTRACT

The present invention provides a method of generating haptic interface experiences that is capable of generating haptic companions to existing two-dimensional images. The method exploits the dominance of visual over haptic in humans: human tactile, proprioceptive, and kinesthetic senses do not supply as much fine detail as human vision, and consequently haptic representations do not have to be as detailed as the corresponding visual images to be believable to a human user. An existing two-dimensional image can be used as the visual component of a human-computer interface. A three-dimensional haptic model that is topologically similar to the image can be selected, where topological similarity means that the haptic model provides an acceptable approximation to important characteristics of the haptic experience desired to accompany the two-dimensional image. A relationship can then be established between the image in the visual component of the interface and the haptic model in the haptic component of the interface such that interaction with the image in the visual component is linked with interaction with the haptic model in the haptic component. As an example, a two-dimensional image of a ball can have a haptic model of a sphere associated therewith, and the center and radius established as a relationship such that visual cursor motion at the boundary of the image of the two-dimensional image of the ball is linked with haptic force feedback as the cursor encounters the surface of the haptic model.

25 Claims, 6 Drawing Sheets

U.S. PATENT DOCUMENTS

| | | | |
|---|---|---|---|
| 5,825,308 | A | 10/1998 | Rosenberg et al. |
| 5,831,408 | A | 11/1998 | Jacobus et al. |
| 5,844,392 | A | 12/1998 | Peurach et al. |
| 5,859,642 | A * | 1/1999 | Jones .................. 715/821 |
| 5,889,670 | A | 3/1999 | Schuler et al. |
| 5,956,484 | A | 9/1999 | Rosenberg et al. |
| 6,028,593 | A | 2/2000 | Rosenberg et al. |
| 6,075,502 | A | 6/2000 | McDowall et al. |
| 6,101,530 | A | 8/2000 | Rosenberg et al. |
| 6,125,385 | A | 9/2000 | Wies et al. |
| 6,131,097 | A | 10/2000 | Peurach et al. |
| 6,147,674 | A | 11/2000 | Rosenberg et al. |
| 6,154,198 | A | 11/2000 | Rosenberg et al. |
| 6,154,201 | A | 11/2000 | Levin et al. |
| 6,161,126 | A | 12/2000 | Wies et al. |
| 6,166,723 | A | 12/2000 | Schena et al. |
| 6,169,540 | B1 | 1/2001 | Rosenberg et al. |
| 6,285,370 | B1 | 9/2001 | McDowall et al. |
| 6,421,048 | B1 * | 7/2002 | Shih et al. .................. 345/419 |
| 6,441,815 | B1 | 8/2002 | McDowall et al. |
| 6,522,906 | B1 | 2/2003 | Salisbury, Jr. et al. |
| 6,535,241 | B1 | 3/2003 | McDowall et al. |
| 6,650,338 | B1 * | 11/2003 | Kolarov et al. .............. 345/619 |
| 6,659,939 | B2 * | 12/2003 | Moll et al. .................. 600/102 |
| 6,792,398 | B1 * | 9/2004 | Handley et al. ................ 703/2 |
| 2003/0011561 | A1 * | 1/2003 | Stewart et al. ............... 345/156 |
| 2004/0091845 | A1 * | 5/2004 | Azerad et al. .............. 434/263 |
| 2005/0062738 | A1 * | 3/2005 | Handley et al. ............. 345/419 |

OTHER PUBLICATIONS

Avila, R. et al. "A Haptic Interaction Method for Volume Visualization." Proc. 7$^{th}$ Conf. Visualization ('96). 1996. pp. 485, 197-204.*

Ruspini, D. et al. "The Haptic Display of Complex Graphical Environments." Proc. of the 24$^{th}$ Annual Conf. on COmputer Graphics and Interactive Techniques. 1997. pp. 345-352.* http://haptic.mech.northwestern.edu/library, Haptics community Web page, visited Apr. 15, 2004.

http://www.cim.mcgill.ca/~haptic/publications.html, Selected publications, visited Apr. 15, 2004.

http://www.hitl.washington.edu/publications, hit lab publications, visited Apr. 15, 2004.

http://www.haptics-e.org, Haptics-e, The Electronic Journal Of Haptics Research, visited Apr. 15, 2004.

* cited by examiner

Stool1.stl

Stool2.stl

Stool3.stl

Table1.stl

Table2.stl

Table3.stl

COORDINATING HAPTICS WITH VISUAL IMAGES IN A HUMAN-COMPUTER INTERFACE

BACKGROUND OF THE INVENTION

This invention relates to the field of haptic human-computer interfaces, specifically to the incorporation of haptic experience with visual information.

Haptic interface experiences are conventionally created using one of two basic methods. In some cases, a graphic or visual interface experience is created from three-dimensional models of objects. A haptic companion to the visual display can be created from the same three-dimensional models. This method produces a haptic interface experience that directly corresponds with the visual display (since it was created from the same models). However, creating three-dimensional models that approach the quality of real world visuals can be prohibitively expensive and time consuming. Also, models that approach real world detail can be too complex to render (either visually or haptically) in real time, making it difficult to provide an effective haptics experience.

In other cases, a visual interface experience is created first, for example by two-dimensional photographs or movies of real objects. A haptic companion to the visual display is then added. This method can provide very realistic visual displays, and current technology can accommodate real time display of such realistic images. Creating the haptic experience from the initial visual images, however, can be quite difficult. Creating it manually is analogous to creating a sculpture from a single two-dimensional photograph. The task is possible, but requires significant time and skill to produce a believable haptic experience. Current research into automatic production of three-dimensional models from two-dimensional images offers hope, but the current state of the art is not capable of generating believable haptic representations from most two-dimensional images.

The addition of a haptic interface component can increase the realism and efficiency of a user's experience with a visual display. Also, many two-dimensional images and image sequences exist (e.g., photographs, digital images, movies); haptic companions to the existing images could enhance the user experience. Accordingly, there is a need for a method of generating haptic interface experiences that is capable of generating haptic companions to existing two-dimensional images.

SUMMARY OF THE INVENTION

The present invention provides a method of generating haptic interface experiences that is capable of generating haptic companions to existing two-dimensional images. The method exploits the dominance of visual over haptic in humans: human tactile, proprioceptive, and kinesthetic senses do not supply as much fine detail as human vision, and consequently haptic representations do not have to be as detailed as the corresponding visual images to be believable to a human user. An existing two-dimensional image can be used as the visual component of a human-computer interface. A three-dimensional haptic model that is topologically similar to the image can be selected, where topological similarity means that the haptic model provides an acceptable approximation to important characteristics of the haptic experience desired to accompany the two-dimensional image. A relationship can then be established between the image in the visual component of the interface and the haptic model in the haptic component of the interface such that interaction with the image in the visual component is linked with interaction with the haptic model in the haptic component. As an example, a two-dimensional image of a ball can have a haptic model of a sphere associated therewith, and the center and radius established as a relationship such that visual cursor motion at the boundary of the image of the two-dimensional image of the ball is linked with haptic force feedback as the cursor encounters the surface of the haptic model.

The method comprises selecting an initial haptic model that approximates haptic characteristics desired for the associated visual image or object within the visual image. For convenience, the description will refer to an object and its corresponding display or visual image, realizing that the object can represent all or just part of the total image. A correspondence can then be established between the initial haptic model and the object's visual image. A haptic model to accompany the visual image of the object can be generated by modifying the initial haptic model so that the generated model in haptic space corresponds to the image of the object in the visual display. Unlike many contemporary haptic modeling methods, the present method does not require a detailed three-dimensional model as input; details from the two-dimensional image combine with the generated haptic model to provide a believable haptic and visual combination.

Haptic experiences produced by the present method can be significantly less complex than those produced from detailed three-dimensional models, easing the demands for real-time haptic and graphic rendering. Also, the present method obviates the time-consuming, and currently largely unsuccessful, process of creation of three-dimensional models from two-dimensional images. Consequently, the present method can economically add believable haptic experiences to the high realism visual images common with contemporary technology.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1A:
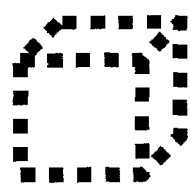
FIG. 1($a,b,c,d$) is a schematic representation of a haptic model, a visual image, and correspondence therebetween.
Figure 1B:
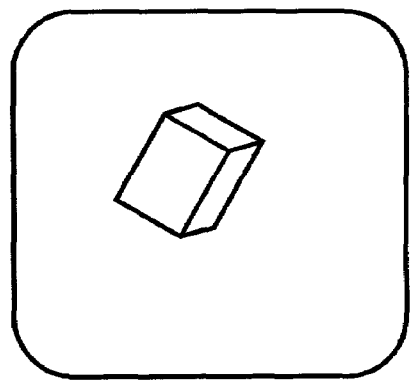

The present invention provides a method of generating haptic interface experiences that is capable of generating haptic companions to existing two-dimensional images. The method exploits the dominance of visual over haptic in humans: human tactile, proprioceptive, and kinesthetic senses do not supply as much fine detail as human vision, and consequently haptic representations do not have to be as detailed as the corresponding visual images to be believable to a human user. An existing two-dimensional image can be used as the visual component of a human-computer interface. A three-dimensional haptic model that is topologically similar to the image can be selected, where topological similarity means that the haptic model provides an acceptable approximation to important characteristics of the haptic experience desired to accompany the two-dimensional image. A relationship can then be established between the image in the visual component of the interface and the haptic model in the haptic component of the interface such that interaction with the image in the visual component is linked with interaction with the haptic model in the haptic component. As an example, a two-dimensional image of a ball can have a haptic model of a sphere associated therewith, and the center and radius established as a relationship such that visual cursor motion at the boundary of the image of the two-dimensional image of the ball is linked with haptic force feedback as the cursor encounters the surface of the haptic model.

The relationship can be established to accomplish a variety of haptic components. For simplicity, the description herein will assume that a haptic component that is approximately faithful to the visual component is desired; those skilled in the art will appreciate that the present invention can be used to provide haptic components that bear any desired relationship to the original visual image.

A method according to the present invention comprises selecting an initial haptic model that approximates haptic characteristics desired for the associated visual image or object within the visual image. For convenience, the description will refer to an object and its corresponding display or visual image, realizing that the object can represent all or just part of the total image. A correspondence can then be established between the initial haptic model and the object's visual image. A haptic model to accompany the visual image of the object can be generated by modifying the initial haptic model so that the generated model in haptic space corresponds to the image of the object in the visual display. Expressed another way, a relationship can be established between the haptic model and the image such that the visual perception of the image and the haptic perception of the model have an acceptably low discrepancy. Unlike many contemporary haptic modeling methods, the present method does not require a detailed three-dimensional model as input; details from the two-dimensional image combine with the generated haptic model to provide a believable haptic and visual combination. Examples of images that can benefit from the present invention include photographs, photorealistic computer renderings, computer graphics, cartoons, drawings, video sequences, and movies. Objects in an image that can benefit from addition of a haptic component include any part of an image for which a haptic model makes sense, for example solid things, shapes, structures, shadows, and regions of an image.

Haptic experiences produced by the present method can be significantly less complex than those produced from detailed three-dimensional models, easing the demands for real-time haptic and graphic rendering. Also, the present method obviates the time-consuming, and currently largely unsuccessful, process of creation of three-dimensional models from two-dimensional images. Consequently, the present method can economically add believable haptic experiences to the high realism visual images common with contemporary technology.

While those skilled in the art will appreciate various orders, details, and combinations of the steps, for convenience of exposition the invention can be discussed by considering the following steps:
1. begin with an initial visual image;
2. select an initial haptic model that is topologically similar to a desired object in the image;
3. establish correspondence criteria between the object in the image and the initial haptic model;
4. determine a transformation of the initial haptic model that generates a haptic model such that the correspondence criteria in the haptic and visual spaces are sufficiently aligned.

Each step is discussed in more detail below, followed by examples to further describe the invention.

Selecting Appropriate Initial Haptic Model

A haptic model that is topologically similar to the object can be selected as the initial haptic model. Attributes such as overall size, rotation, scale, and relative scale within the model can be modified according to the present method to generate a believable haptic model. Topological similarity ensures that the initial model has the appropriate characteristics for modification. For example, a cube can serve as an initial model for many six-sided figures; a four-door sedan can serve as an initial haptic model for many four-door sedans, etc.

The initial haptic model can be selected by human intervention, allowing an operator's visual and geometric experience to guide the selection. Alternatively, contemporary image recognition techniques can allow recognition of an object's topological characteristics, allowing automated selection of appropriate initial haptic model. A simple example of accessing a library of prepared 3D objects is to scroll through thumbnail images of the available objects until one is found that is similar to the desired object. Building on that example, a database can be created that contains words or phrases associated with each object. For example, inputting the words "car", "auto", "automobile", or "vehicle" would reduce the selection to only models of cars and trucks. From there, the user might enter "2-door" or "SUV" to reduce the selection even further. Finally, image recognition can be used so that this selection is found automatically. After reducing the possible 3D models to just a few or just one option, the user can have the opportunity, if desired, to make the final selection of the object manually.

The examples below further illustrate selection of an initial haptic model.

Establishing Correspondence Points

Once an initial haptic model has been selected, a correspondence can be established between the initial haptic model and the image of the object. For example, visible corners of a box can be set to be in correspondence with corners of a cubic initial haptic model. The points can be defined, e.g., the corners of a cube, or can be left to the user to identify. The points can be set by a user, e.g., selecting points on the image and corresponding points on the initial haptic model. The points can also be set with computer assist, e.g., determining corresponding points by image recognition, or by feature tracking once a correspondence has been established in one frame of a sequence of frames. As used herein, a correspondence point can include points in the model or image, surfaces in the model or image, a radius or other parameter in the model or image, or any other characteristic that can be identified as connecting the model and the image. The examples below further illustrate establishment of correspondence points between the visual and haptic spaces.

Generating a Modified Haptic Model

A believable haptic model for the object in the image can then be generated by modifying the initial haptic model. The modification can proceed in various ways, with the objective of determining a modification of the initial haptic model such that the projection of the generated model in the plane of the image corresponds to the display of the object in the image. As an example, define a set of parameterized operations O that modify a haptic model in various ways. The operations in O can be any modifications that are meaningful in the context of the model, including, for example, scale along various axes, rotation about various axes, relative scale among constituent parts of the model, distance between features, etc. Define an operator P that produces the projection of a haptic model in the plane of the image. Then, if J is the object in the image, and H is the initial haptic model, the problem is to find the set of parameters to be applied with O such that P(O(H)) approximates J. Defining a difference between P(O(H)) and J as an error metric, contemporary computer techniques can allow solution for parameters that minimize the error metric. See, e.g., Fosdick, L. D., E. R. Jessup, C. J. C. Schauble, and G. Domik [1996] *An Introduction to High-Performance Scientific Computing*, M.I.T. Press, Cambridge, Mass.; Mitchell, M.

*An Introduction to Genetic Algorithms*, M.I.T. Press, Cambridge, Mass.; Koza, J., F. H. Bennett III, D. Andre, and M. A. Keane, [1999] *Genetic Programming III—Darwinian Invention and Problem Solving*, Morgan Kaufmann Publishers, San Francisco, Calif.

Extending to a Sequence of Images

The method of the present invention can also efficiently generate haptic models to accompany a sequence of images. Generally, the initial haptic model need be selected only once for each object in the sequence. The points of correspondence can be identified by an operator in each image. Image tracking techniques can replace or assist the operator in this task by tracking the location of points as objects change from image to image within the sequence. Further, the parameters determined in one image for generation of the haptic model can be used to begin the solution of haptic model modification in adjacent images, reducing the solution time required.

Incorporating the Haptic Model with the 2D Image

The interface presented to the user can be considered as comprising two spaces: a visual space and a haptic space. The visual space can be expressed to the user with a display, with visual cues such as moving arrows indicating the user's position within the visual space. The haptic space can be expressed to the user with force communication in appropriate input/output devices, transmitting force to the user indicating the user's position relative to forces in the haptic space. With the present method, the generated haptic model can be placed in the haptic space such that the projection of the generated haptic model in the plane of the display corresponds to the visual representation of the object in the display. Consequently, a visual cursor approaching the object in the visual space corresponds with a haptic cursor approaching the haptic model of the object in the haptic space.

Depth in a three-dimensional haptic space added to a two-dimensional visual space can be accommodated in several ways. For example, depth can be determined from the haptic models if all the haptic models are linked: if every object is located touching a surface of a cube, then the haptic model of the cube can define the depth relationships of all the objects in the haptic space. Alternatively, if the models are not connected, then the haptic space need not define relative depth of the objects. Instead, the depth of the haptic cursor at the time that the visual cursor first contacts the object can define an initial depth for the corresponding haptic model; depth in subsequent haptic interaction with that model can be relative to that initial depth until the user contacts another object.

Visual clues can also help the user to experience the integration the haptic and visual spaces for the user. For example, the visual cursor graphic can help communicate haptic depth. The visual cursor graphic can be depicted with an axis held to be normal to the nearest haptic surface. The visual cursor graphic can be ghosted when contacting regions of a haptic model that are not visible in the visual space (e.g., when feeling the back side of an object), allowing a user to feel in three-dimensions what is only seen in two-dimensions. The visual cursor can also be made to simply disappear when an object in haptic space occludes the position of the cursor in haptic space. This can be done, for example, using graphics depth-buffering techniques.

The haptic model can be made more realistic to the user by defining other haptic attributes to apply to the generated haptic model. For example, a surface can be given a defined stiffness, a defined texture, friction, bump map, viscosity, stick point, etc. Further, the interaction with the image and the haptic model can allow interaction with one to affect the other. For example, touching, pushing, pulling, or modifying a surface according to forces in the haptic space can be fed back to the display to cause modification of the image to reflect the perceived changes made by the user in the haptic space.

Example Implementation

Figure 3:
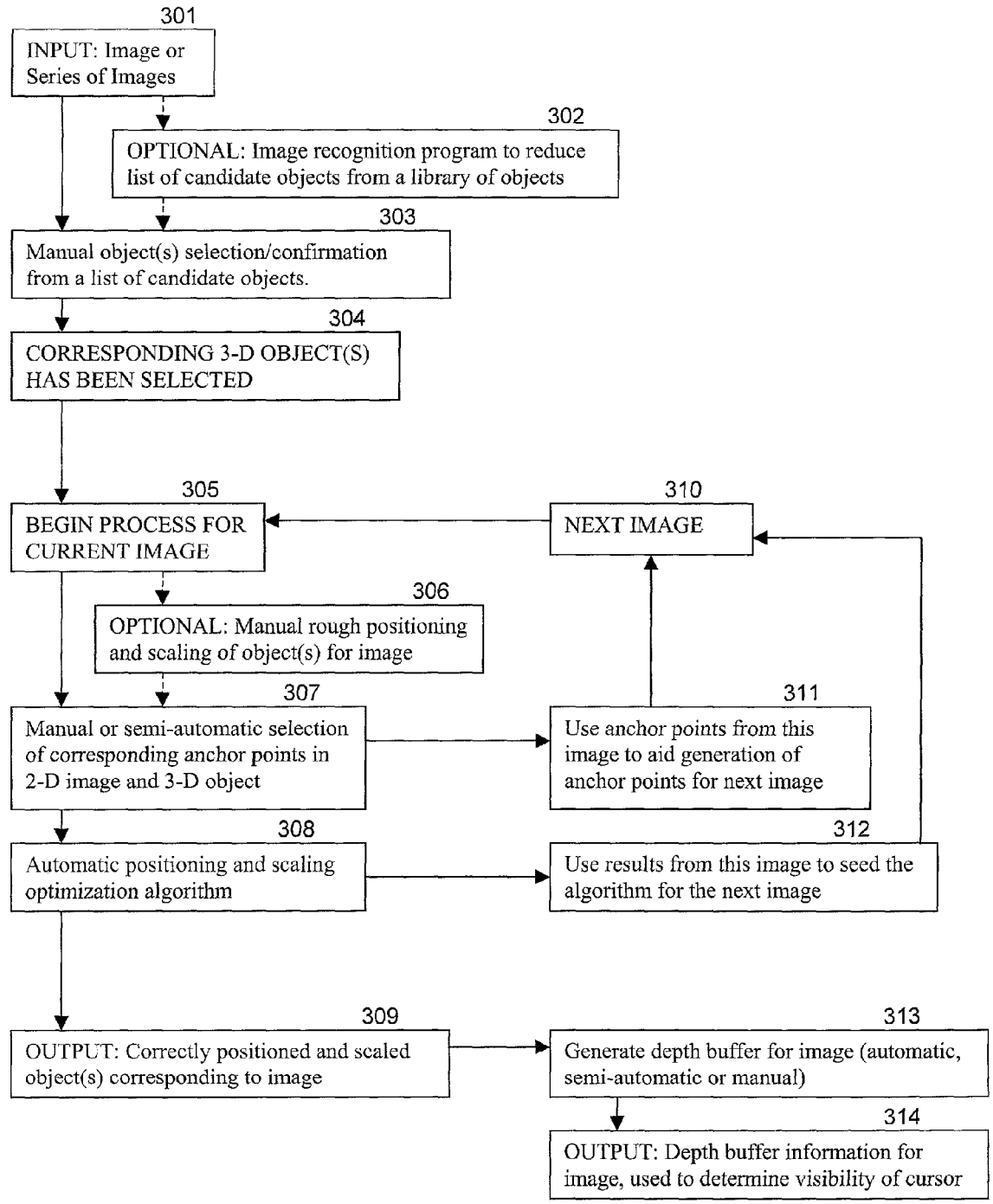
FIG. 3 is a flow diagram of one implementation of the present invention.

FIG. 3 is a flow diagram of one implementation of the present invention. The method begins with an image or sequence of images 301. An initial haptic model is selected, by image recognition 302, manual selection or definition 303, or a combination of both. Once the initial haptic model has been selected 304, the haptic model can be transformed to align with the present image 305.

The transformation can begin with a manual rough positioning and scaling of the haptic model 306, in some cases easing the remaining tasks. Points of correspondence, called anchor points in the figure, can then be identified on the haptic model and the visual image 307. The transformation can then be determined by solution for transformation parameters that yield an acceptable error metric 308, producing a correctly positioned and scaled haptic model for the object in the image 309. The haptic model can be used to generate depth information for the two-dimensional image 313, enabling appropriate display of a cursor moving in three-dimensions in conjunction with the original two-dimensional image 314.

If the method is to be applied to a sequence of images, then, if the object is present in the next image, the establishment of correspondence between the haptic model and the next image can be made easier by using the correspondence in the present image as a start 311. The solution of the transformation for the next image can also benefit from using the solution of the transformation for the present image as a start 312. The initial haptic model, plus the correspondence and transformation solution, can be used with the next image 310 to determine its haptic model.

An implementation of the present invention was written in C++, using OpenGL, the e-Touch™ Applications Programming Interface, Alpha version 1, from Novint Technologies, Inc., and as a haptic device, a Sensable Technologies' Phantom. It was compiled using Microsoft Visual C++ on a contemporary personal computer with Microsoft's Windows NT operating system.

A library of 3D models was compiled that contained files in many different file formats, including VRML, 3DStudioMax, STL-Stereolithography and others. A conventional image viewing program was used to browse the objects by looking at thumbnail images of them. Once a model was selected, the 3D model file was converted into a haptic representation by reading a list of triangles from the particular file format, and then storing them in memory in a form that facilitates the analysis of force effects from those triangles to any given point.

A custom editor, allowing the user to select (using a haptic device) points of interest on the 3D model and then select corresponding points on the 2D image or images, was written using the e-Touch™ programming environment from Novint Technologies, Inc.

To solve for the correct transform for each 3D object for each 2D image, the following variables were calculated in each case: x scale, y scale, z scale, and ordered rotation about the x, y, and z axes. The custom editor mentioned above generated an output file that contained all of the necessary information to solve for these variables. This file was then input to a solver program written for Matlab v5.2. An example of suitable software follows the description. The solver program used a search algorithm with a random component (repeated cycles of random mutations applied to an array of floating point numbers) to find acceptable solutions for the variables for each 3D object for each 2D image. The solver program outputted a file containing all of these variables. A haptic viewer program was written using the e-Touch™ programming environment. The haptic viewer program allowed a user to view and touch the 2D image and 3D object combinations (the haptic object models could also be used to augment existing image viewing applications).

The e-Touch™ library made implementation of the 2D image/3D object combination more convenient. It has many built-in functions that were very useful for giving the user a believable and effective haptic/visual experience. The user can change the viewpoint, the appearance of the cursor, the lighting, as well as the position, rotation, scaling, and haptic texture of objects using a 3D menu interface.

The scaling, rotation, and (x,y,z) position of each object was established using the solver program. The z position (the z axis refers to the axis normal to the computer screen), however, can vary over a range, and still provide a good haptic experience. For example, the nearest or farthest point of the positioned 3D models could be aligned with the z position of the 2D image, or any point in between. Using the e-Touch™ programming environment, a variable z position was enabled, which provided that the first time the cursor touched the z plane of the 2D image, the overall z position of the 3D objects would be reset so that the cursor was touching an object, if possible. This alleviated the problem of reaching into a picture and not immediately touching something, and thereby becoming disoriented.

Figure 9:
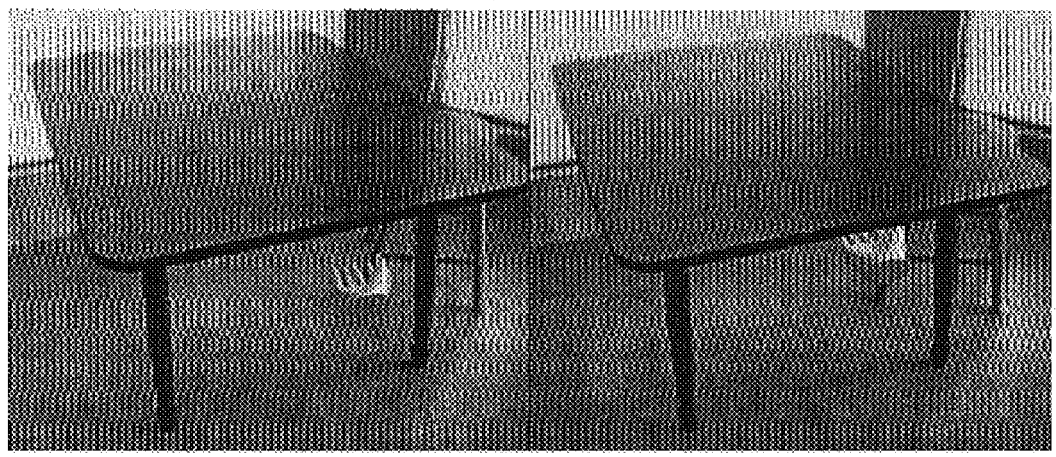
FIG. 9 presents an image of a visual/haptic cursor about to touch the bottom of the table in the image, and then actually touching the bottom of the table in the image, and being occluded in the process.

Another aid that was programmed into the e-Touch™ programming environment for this example was intended to give the user a visual cue that signaled when the cursor was being occluded by an object in the scene, or reaching around it. This was implemented by using batch-mode image processing with Adobe Photoshop v5.0 to generate simple black and white images from all of the 2D images. These black and white images were thresholded so that all objects that had 3D models were white, and the rest (the background) was black. These images were used to generate OpenGL Stencils that, in the e-Touch™ programming environment, were used to occlude parts of the cursor that would have been behind the objects in the image. The determination of whether the cursor was behind an object or not was based on the cursor's position, and the surface normal of the object being touched. If the surface normal was tending toward the negative-z direction (i.e. away from the viewer) and part of the drawn cursor was in the white zone of the stencil, then that part was not drawn. The result of this technique was that the cursor (in this case, the cursor was in the shape of an open hand) is always visible (appearing to actually be in the 2D image), except when parts of it are occluded by objects in the picture (making the objects in the 2D image appear to be actual 3D objects). FIG. 9 illustrates this technique. The visual location of the cursor can also be adjusted to compensate for discrepancies between the object in the photo and the haptic model. For example, when touching the model, the visible cursor can be made to "snap-to" the image of the object at all times, which effectively reduces any disturbance of the user's viewing/haptic experience that might be caused by feeling a haptic response but seeing the cursor not touching the object.

EXAMPLES

Single Object, Single Image Example

FIG. 1(a,b,c,d) illustrates the present invention as applied to a single object in a single image. FIG. 1b shows an image as displayed in a display medium such as a computer screen. An object is represented 101 in the image; in the example, object 101 is a rectangular polyhedron represented in the image as rotated and tilted relative to the viewer. FIG. 1b shows a simple haptic model of a cube, with six faces defined for interaction is a force feedback interface. The haptic model comprises handles positioned at each of the cube's corners. The handles collectively define the haptic surfaces of the cube. The generality of the handles and the rules for modifying the haptic model in accordance with the handles determines the range of objects that the haptic model can represent.

Figure 1C:
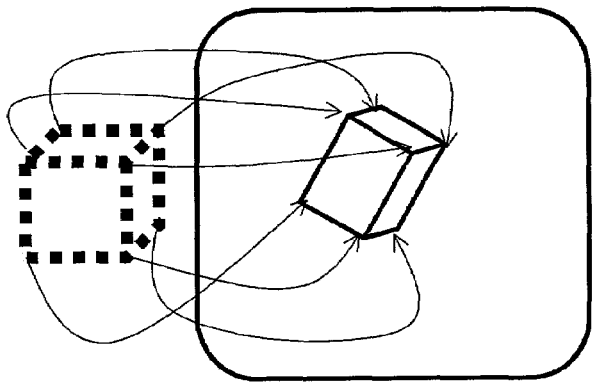
Figure 1D:
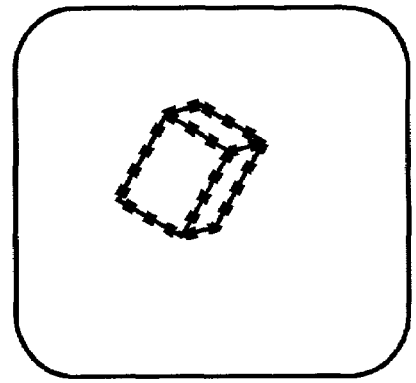
Figure 2A:
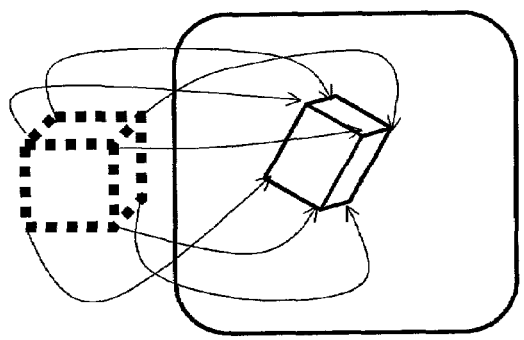
FIG. 2($a,b,c,d$) is a schematic representation of the present invention applied to an object in a sequence of images.
Figure 2B:
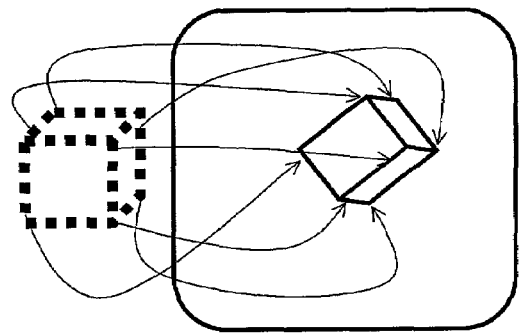
Figure 2C:
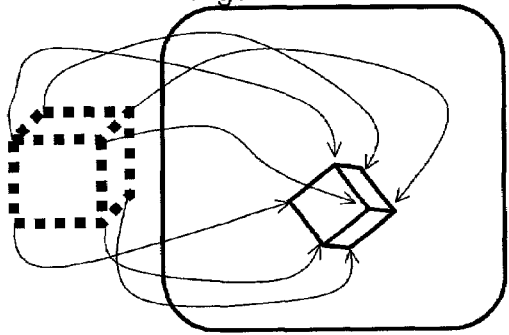
Figure 2D:
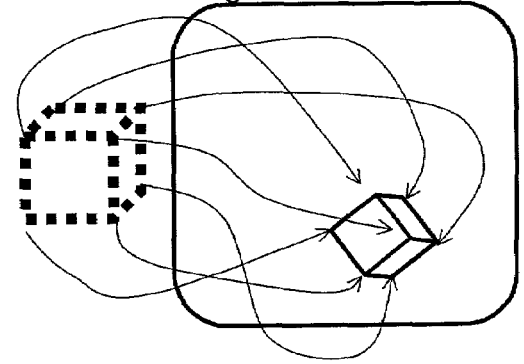

FIG. 1c shows the haptic model with its handles placed in correspondence with the corners of the visual representation of the object. FIG. 1d shows the resulting haptic experience added to the visual image; with the haptic model, in haptic space shown as heavy dashed lines, mapped so that the haptic experience correlates with the visual image.

Cursor motion in the visual display relative to the corners of the visual representation of the object can be mapped to haptic cursor in the haptic space relative to the corresponding handles of the haptic model. Establishing correspondence between the visual representation of the object and the haptic model handles allows the same initial haptic model to be used to provide a haptic experience for many different objects within a class of objects at many different locations and orientations in the image. A single cube model, as in the figure, can correspond to cubes and rectangular polyhedra of many sizes and aspect ratios. Further, the same cube model can be twisted and scaled to correspond to any six faced closed object, even those with twists or other complexities. The example shows an object whose three-dimensional haptic model would be simple; more complex cube-like objects (e.g., with curved sides or ends with relative twists) could also use the same base haptic model as long as the correspondence between the handles of the haptic model and the object produces a haptic experience within the haptic compensation range of a faithful haptic model of the object. The method can produce an acceptable haptic model for an existing image at lower development cost than contemporary methods, and can produce a haptic model that is simpler and hence less demanding of compute power than traditional haptic models.

Single Object, Image Sequence Example

FIG. 2(a,b,c,d) illustrates the method of the present invention applied to an object in a sequence of images. The object moves from left to right and rotates during the images. As before, a simple haptic model representative of characteristics of the object can be selected. For each image, the simple haptic model can have correspondence established with features of the object, as shown in FIG. 2a. Contemporary image processing techniques can allow the correspondence in some subsequent images to be derived from correspondence established in the initial image, further reducing the cost of supplying the haptic experience. As the object moves and rotates in the sequence in FIGS. 2b, 2c, 2c, the haptic model is transformed to keep the alignment between points in the haptic space in points in the visual image.

The method of the present invention accordingly can add a haptic experience to a sequence of images, with possibly even greater efficiency benefits than discussed in the single image example. An existing image sequence, for example an existing computer animation, can be efficiently enhanced with a haptic experience by practice of the present invention. Human perception of moving objects can require less precise rendering than stationary objects. Consequently, the present invention can require less precise alignment of the haptic model with the object to provide realistic haptic models for moving objects.

Multiple Object Image Sequence Example

Figure 4:
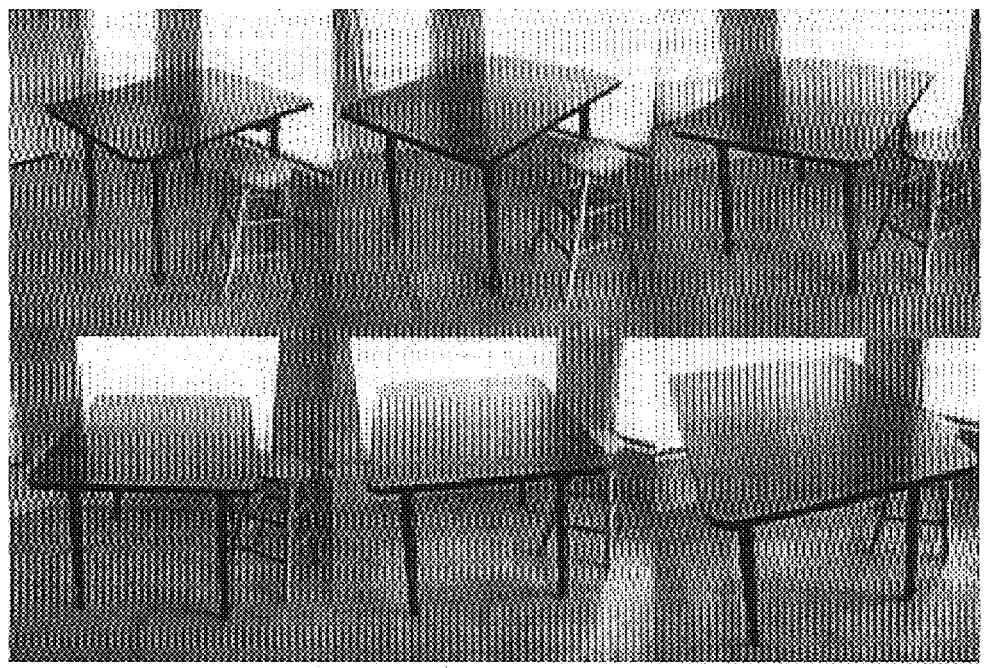
FIG. 4 presents a sequence of images comprising a table and a chair, viewed from different viewpoints.
Figure 5:
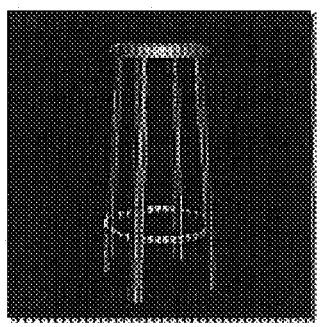
FIG. 5 is an illustration of a simplistic library of haptic models.
Figure 5:
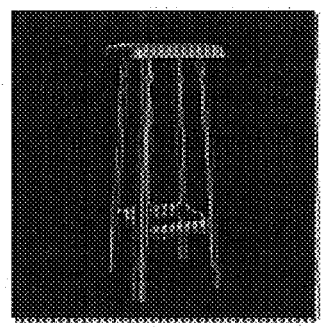
Figure 5:
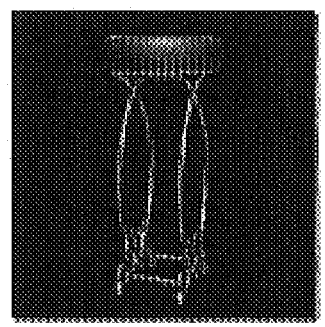
Figure 5:
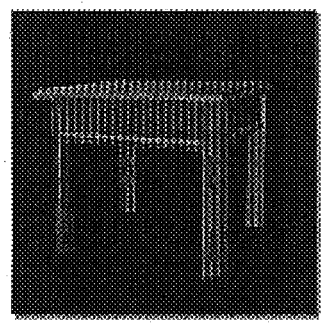
Figure 5:
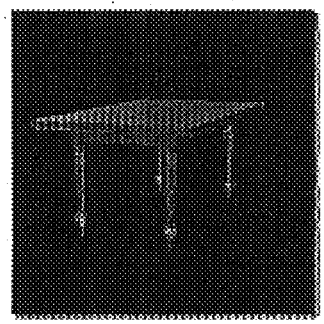
Figure 5:
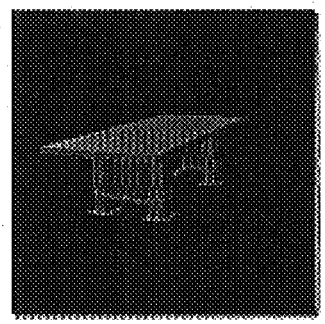
Figure 6:
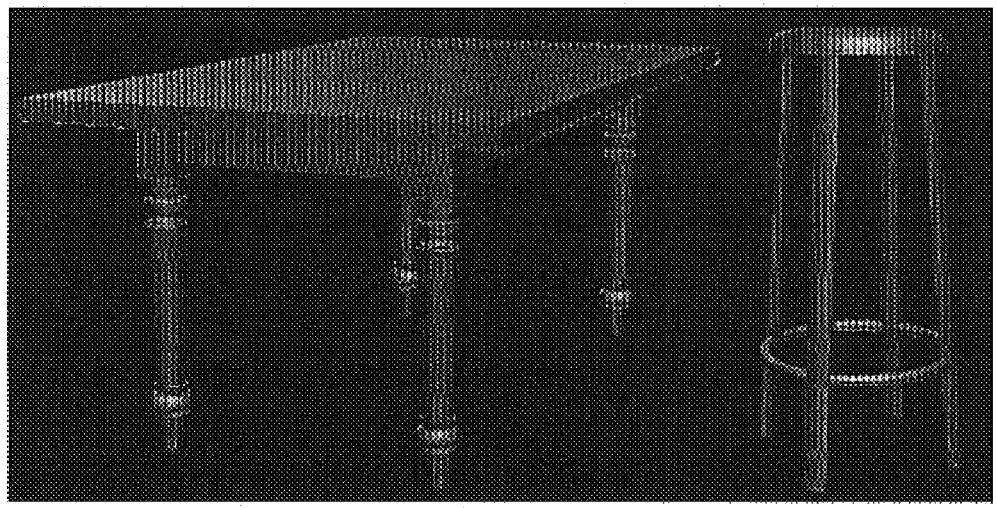
FIG. 6 depicts haptic models selected to be topologically similar to the objects in FIG. 4.
Figure 7:
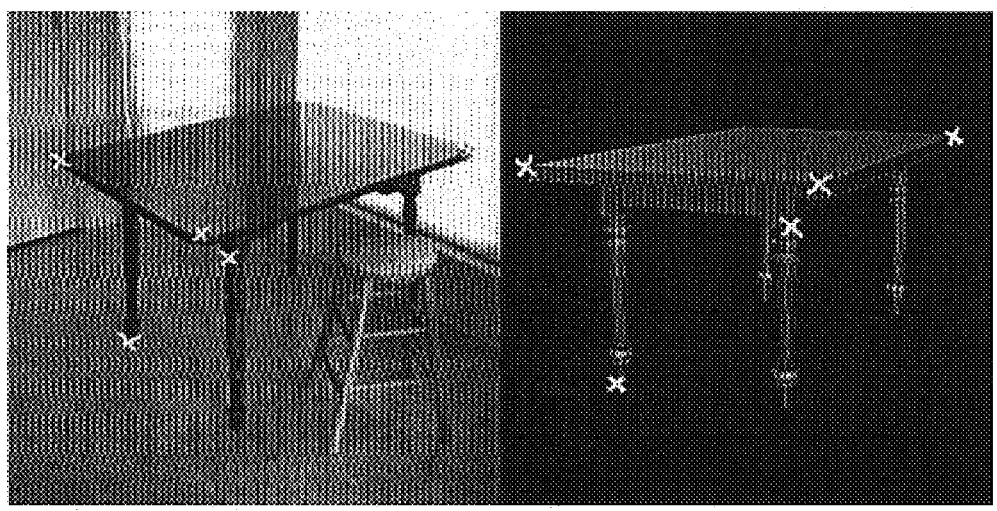
FIG. 7 is an illustration of the correspondence established between points on an object in an image and points on a selected haptic model.
Figure 8:
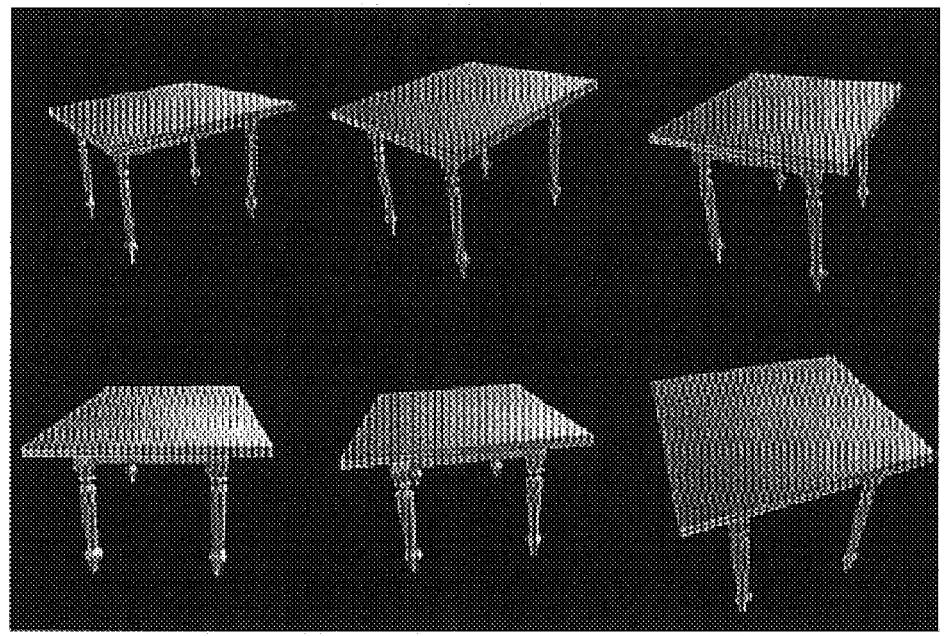
FIG. 8 presents a sequence of images of a haptic model of a table that has been automatically transformed to correspond to the images in FIG. 4.

FIG. 4 presents a sequence of images comprising a table and a chair, viewed from different viewpoints. A library of haptic models, represented simplistically by the three chairs and three tables in FIG. 5, can be consulted to select initial haptic models for the chair and the table. FIG. 6 shows the haptic models selected. Note that they are topologically similar to the chair and table, but not identical (given the limited scope of the simplified library). FIG. 7 shows the correspondence established between points on the table in the image and points on the selected haptic model. The transformation can then be determined to alter the haptic model to align with the table in the image. The process can be repeated for all the images in the sequence. FIG. 8 shows the transformed position of the table for each image. These transformations were generated by the Matlab solver. A similar process is engaged for the chair. The same initial haptic model can be used for each image if the topology of the object in the image does not change. The correspondence points can be manually set in each image, or can be tracked across images with appropriate image processing software.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

---

COMPUTER PROGRAM

```
%
% matlab script findmat_patent: simple algorithm, finds x, y, z rot
% suitable for input to etouch alpha version, for a series of
% pictures, used for the kitchen table example for the patent app
%
% The algorithm does not use any crossover, so it might not be
% officially an evolutionary algorithm: instead it is an algorithm
% with a large random component, perhaps call it random hill-climbing
% with teleportation. Any search algorithm that minimizes an error
% function will do.
% There is a population of 1, and during each cycle a new candidate
% is created using mutation or randomization, and if it is better
% than the currentbest candidate, then it replaces the current
% best candidate.
% The best candidate is the one with the smaller sum of errors
% between the desired 2d anchor point positions and the actual ones.
%
clear;
doXYZScale = 1;%set to 1 if different scale in x, y, z directions allowed
minScale = 1.00;%make initial guess here, change later if needed
maxScale = 4.00;%make initial guess here, change later if needed
cyclesLimit = 5000;%time limit to stop processing and print best vals
%randomCountLimit is used to specify in what percentage of cycles
%a mutate occurs, and in what percentage a pure randomization happens
```

-continued

---
COMPUTER PROGRAM
---

```
randomCountLimit=1;%-1=all random, 0=all mutate, 1=alternate, 2=2:1, etc
%angle limits only used for random, not for mutate cycles
    minXrot = 0;
    maxXrot = pi/2;
    minYrot = 0;
    maxYrot = pi/2;
    minZrot = 0;
    maxZrot = 2*pi;
numPoints=7;%the # of anchor points used
numPictures = 6; %6 images for kitchen app
points2d = zeros (numPoints,3,numPictures);
%Input data printed out by eTouch.
%The goal is to find the best matrix (for each image) that
%will move all of the 3d points to positions that will
%project onto the 2d points.
points3d = [ . . .
        192.285843 −2.626391 0.155567; . . . %3d RELATIVE==ABSOLUTE
        191.888973 −0.524172 −116.115759; . . . %3d RELATIVE==ABSOLUTE
        0.983776 0.355283 −116.163668; . . . %3d RELATIVE==ABSOLUTE
        170.254251 −85.511119 −24.442749; . . . %3d RELATIVE==ABSOLUTE
        168.142750 −87.777715 −93.153169; . . . %3d RELATIVE==ABSOLUTE
        23.948484 −87.682190 −94.730208; . . . %3d RELATIVE==ABSOLUTE
        24.281173 −87.216337 −23.443922; . . . %3d RELATIVE==ABSOLUTE
];
points2d(:,:,1) = [ . . .
        275.309455 83.214137 0; . . . %image 0 RELATIVE point
        114.495779 132.510748 0; . . . %image 0 RELATIVE point
        −133.694809 77.261150 0; . . . %image 0 RELATIVE point
        221.094400 −102.363699 0; . . . %image 0 RELATIVE point
        99.524048 −38.445725 0; . . . %image 0 RELATIVE point
        −64.799203 −104.203411 0; . . . %image 0 RELATIVE point
        41.469303 −195.316705 0; . . . %image 0 RELATIVE point
];
if numPictures>1,
points2d(:,:,2) = [ . . .
        218.867384 121.400738 0; . . . %image 1 RELATIVE point
        22.559875 156.553207 0; . . . %image 1 RELATIVE point
        −214.561817 72.555549 0; . . . %image 1 RELATIVE point
        169.072408 −72.126085 0; . . . %image 1 RELATIVE point
        23.848657 −19.373604 0; . . . %image 1 RELATIVE point
        −129.134379 −120.260106 0; . . . %image 1 RELATIVE point
        25.711326 −204.334817 0; . . . %image 1 RELATIVE point
];
points2d(:,:,3) = [ . . .
        112.764785 132.273725 0; . . . %image 2 RELATIVE point
        −100.259518 152.139467 0; . . . %image 2 RELATIVE point
        −285.674820 46.350370 0; . . . %image 2 RELATIVE point
        71.917498 −62.639467 0; . . . %image 2 RELATIVE point
        −91.935666 −29.969876 0; . . . %image 2 RELATIVE point
        −200.345201 −145.243821 0; . . . %image 2 RELATIVE point
        −7.487394 −203.369369 0; . . . %image 2 RELATIVE point
];
points2d(:,:,4) = [ . . .
        −11.934047 131.148859 0; . . . %image 3 RELATIVE point
        −238.068751 136.507432 0; . . . %image 3 RELATIVE point
        −350.536852 7.968564 0; . . . %image 3 RELATIVE point
        −39.482138 −58.823347 0; . . . %image 3 RELATIVE point
        −213.230672 −52.077085 0; . . . %image 3 RELATIVE point
        −268.666024 −188.825387 0; . . . %image 3 RELATIVE point
        −43.110497 −202.989492 0; . . . %image 3 RELATIVE point
];
points2d(:,:,5) = [ . . .
        −113.480282 136.197889 0; . . . %image 4 RELATIVE point
        −347.288771 120.585898 0; . . . %image 4 RELATIVE point
        −368.112180 −37.442752 0; . . . %image 4 RELATIVE point
        −129.718343 −56.009057 0; . . . %image 4 RELATIVE point
        −307.667502 −74.931466 0; . . . %image 4 RELATIVE point
        −298.063029 −228.241851 0; . . . %image 4 RELATIVE point
        −68.295322 −200.561027 0; . . . %image 4 RELATIVE point
];
points2d(:,:,6) = [ . . .
        −209.720635 166.568170 0; . . . %image 5 RELATIVE point
        −475.083841 129.589154 0; . . . %image 5 RELATIVE point
        −402.766562 −94.181736 0; . . . %image 5 RELATIVE point
        −214.845518 −35.085400 0; . . . %image 5 RELATIVE point
```

-continued

COMPUTER PROGRAM

```
            -401.784099 -65.628429 0; . . . %image 5 RELATIVE point
            -345.100783 -281.616119 0; . . . %image 5 RELATIVE point
            -105.140724 -210.696301 0; . . . %image 5 RELATIVE point
    ];
end
%these are the values that we start with: the best so far for pic 1
    bestTestScale = 2.2;%only used if xyz scaling not enabled
%Set a start point for the simulation here. In this way, you can
%run it numerous times, each time starting where the last one
%left off.
%   for this start data, sum of errs: 1002.6
allBestRot = [ . . .
        0.26339      0.51611      0.24429; . . .
        0.24962      0.85072      0.39854; . . .
        0.14894      1.1549       0.46844; . . .
    0.00036665       1.5033       0.32438; . . .
        6.1839       1.6833       0.39488; . . .
        6.0519        1.891       0.72959; . . .
    ]
allBestScale = [ . . .
        1.5527       2.2051       2.5669; . . .
        1.6882       2.5526       2.5443; . . .
        1.6355       2.6015       2.6763; . . .
        2.5705       2.4648       2.8338; . . .
        2.3443       2.6666       3.0994; . . .
        1.8202       3.4847       3.4619; . . .
    ]
lgScaleMultiplier = maxScale-minScale;
smScaleMultiplier = lgScaleMultiplier/10;
smScaleMin = smScaleMultiplier/2;
sumOfErrors = 0;
for whichPic = 1:numPictures,
    bestErrorSum = 9999999999999;%big number
    bestTestRotX = allBestRot(whichPic,1);
    bestTestRotY = allBestRot(whichPic,2);
    bestTestRotZ = allBestRot(whichPic,3);
    bestTestScaleX = allBestScale(whichPic,1);
    bestTestScaleY = allBestScale(whichPic,2);
    bestTestScaleZ = allBestScale(whichPic,3)
    thisPoints2d = points2d(:,:,whichPic);
    newPoints = zeros(numPoints,3);
    bestNewPoints = zeros(numPoints,3);
    randomCount=0;
for count = 1:cyclesLimit,
    if count~=1 %%%%if this isnt the 1st time thru
    doRandom = 1;
    if randomCountLimit>-1
        if randomCount>=randomCountLimit
            doRandom = 0;
            randomCount=0;
        else
            randomCount= randomCount+1;
        end
    end
    if doRandom==1
        %RANDOM MAT
        if ~doXYZScale,
            testScale = lgScaleMultiplier*rand(1)+minScale;
        else
            testScaleX = lgScaleMultiplier*rand(1) + minScale;
            testScaleY = lgScaleMultiplier*rand(1) + minScale;
            testScaleZ = lgScaleMultiplier*rand(1) + minScale;
        end
        testRotX = (maxXrot-minXrot)*rand(1) + minXrot;
        testRotY = (maxYrot-minYrot)*rand(1) + minYrot;
        testRotZ = (maxZrot-minZrot)*rand(1) + minZrot;
    else
        %DELTA FROM CURRENT BEST MAT: MUTATION
        if ~doXYZScale
            testScale = bestTestScale + smScaleMultiplier*rand(1) - smScaleMin;
        else
            testScaleX = bestTestScaleX + smScaleMultiplier*rand(1) - smScaleMin;
            testScaleY = bestTestScaleY + smScaleMultiplier*rand(1) - smScaleMin;
            testScaleZ = bestTestScaleZ + smScaleMultiplier*rand(1) - smScaleMin;
        end
        testRotX = bestTestRotX + rand(1)*pi/8 - pi/16;
        testRotY = bestTestRotY + rand(1)*pi/8 - pi/16;
```

-continued

COMPUTER PROGRAM

```
        testRotZ = bestTestRotZ + rand(1)*pi/8 – pi/16;
        if testRotX>2*pi, testRotX=testRotX–2*pi; end
        if testRotY>2*pi, testRotX=testRotY–2*pi; end
        if testRotZ>2*pi, testRotX=testRotZ–2*pi; end
        if testRotX<0, testRotX=testRotX+2*pi; end
        if testRotY<0, testRotX=testRotY+2*pi; end
        if testRotZ<0, testRotX=testRotZ+2*pi; end
    end
else%%%%%%%%%%%%%%%%%%%%%%%%%%%%%%%%%%%%
        %first time thru, just recalc best error
        if ~doXYZScale
            testScale = bestTestScale;
        else
            testScaleX = bestTestScaleX;
            testScaleY = bestTestScaleY;
            testScaleZ = bestTestScaleZ;
        end
        testRotX = bestTestRotX;
        testRotY = bestTestRotY;
        testRotZ = bestTestRotZ;
end%%%%%%%%%%%%%%%%%%%%%%%%%%%%%%%%%%%%
%consider the option here to let all the later images
%use the 1st image's scale: currently disabled
        %if whichPic~=1,
        %   testScale = bestTestScale;
        %   testScaleX = bestTestScaleX;
        %   testScaleY = bestTestScaleY;
        %   testScaleZ = bestTestScaleZ;
        %end
% the matlab function "makerotmat" creates a 3x3 rotation matrix
rotMatX = makerotmat(testRotX,cos(testRotY),0,–sin(testRotY));
rotMatY = makerotmat(testRotY,0,1,0);
rotMatZ = makerotmat(testRotZ,0,0,1);
if ~doXYZScale
        scaleMat = eye(3)*testScale;
else
        scaleMat = eye(3);
        scaleMat(1,1) = testScaleX;
        scaleMat(2,2) = testScaleY;
        scaleMat(3,3) = testScaleZ;
end
%totalMat is the final transform matrix!!
totalMat = rotMatX*rotMatY*rotMatZ*scaleMat;
errSum = 0;
for i = 1:numPoints,
        newPoints(i,:) = (totalMat*points3d(i,:)')';
        newPoints(i,3) = 0;
        errVec = newPoints(i,:) – thisPoints2d(i,:);
        errSum = errSum + . . .
           sqrt( errVec(1)^2 + errVec(2)^2 );
end
if errSum < bestErrorSum
        bestNewPoints = newPoints;
        bestErrorSum = errSum;
        bestTestRotX = testRotX;
        bestTestRotY = testRotY;
        bestTestRotZ = testRotZ;
        if ~doXYZScale
           bestTestScale = testScale;
        else
           bestTestScaleX = testScaleX;
           bestTestScaleY = testScaleY;
           bestTestScaleZ = testScaleZ;
        end
    end
end
%print out this picture's info
        '***************'
        whichPic
        bestErrorSum
        str=sprintf('( %f, %f, %f );//rot\n',bestTestRotX, . . .
           bestTestRotY,bestTestRotZ )
        if ~doXYZScale
           str=sprintf('( %f, %f, %f );//scale\n',bestTestScale, . . .
               bestTestScale,bestTestScale )
        else
```

-continued

COMPUTER PROGRAM

```
        str=sprintf('( %f, %f, %f );//scale\n',bestTestScaleX, ...
             bestTestScaleY,bestTestScaleZ )
        end
        allBestRot(whichPic,1) = bestTestRotX;
        allBestRot(whichPic,2) = bestTestRotY;
        allBestRot(whichPic,3) = bestTestRotZ;
        allBestScale(whichPic,1) = bestTestScaleX;
        allBestScale(whichPic,2) = bestTestScaleY;
        allBestScale(whichPic,3) = bestTestScaleZ;
    sumOfErrors = sumOfErrors + bestErrorSum;
end
%print out the final results
sumOfErrors
allBestRot
allBestScale
```

I claim:

1. A method of generating a three-dimensional haptic component of a human-computer interface corresponding to a two-dimensional image of an object, comprising:
 a) Selecting from a library of haptic models an initial haptic model that is topologically similar to the object;
 b) Establishing correspondence between a set of correspondence points in the three-dimensional initial haptic model and a set of correspondence points in the two-dimensional image of the object;
 c) Generating a final haptic model by modifying the initial haptic model so that the two-dimensional projection of the correspondence points in the final haptic model are substantially aligned with the correspondence points in the two-dimensional image of the object;
 wherein modifying the initial haptic model comprises modifying the initial haptic model according to a set of parameterized operations, and determining parameters for the operations that produce a final haptic model whose correspondence points in a two-dimensional projection are collectively within an error metric of the correspondence points in the image of the object; and
 wherein the set of parameterized operations include one or more of the following: scale along an axis, and relative scale between parts of the model.

2. The method of claim 1, wherein selecting from a library comprises using automated image recognition to select three-dimensional models having two-dimensional projections similar to the object.

3. The method of claim 1, wherein establishing correspondence comprises presenting a representation of the initial haptic model to a user, and accepting from the user specification of points in the initial haptic model to place in correspondence with points in the display of the object.

4. The method of claim 3, wherein accepting from the user specification of points in the initial haptic model to place in correspondence with points in the display of the object comprises monitoring the position of a cursor, and identifying the position of the cursor in the haptic model as a correspondence point responsive to an indication from the user.

5. The method of claim 1, wherein the image of the object is one of a sequence of images, and further comprising determining correspondence points in the image of the object in other images in the sequence, and further comprising generating haptic models for the object in other images in the sequence according to the haptic model correspondence points and the correspondence points determined for the object in each of the other images in the sequence.

6. A method of providing a human-computer interface comprising a two-dimensional visual space and a generated three-dimensional haptic space; comprising:
 a) Selecting from a library of haptic models an initial haptic model that is topologically similar to the object;
 b) Establishing correspondence between a set of correspondence points in the three-dimensional initial haptic model and a set of correspondence points in the two-dimensional image of the object;
 c) Generating a final haptic model by modifying the initial haptic model so that the two-dimensional projection of the correspondence points in the final haptic model are substantially aligned with the correspondence points in the two-dimensional image of the object.
 d) Establishing a correspondence between a haptic cursor in the haptic space and a visual cursor in the visual space;
 e) changing the haptic cursor position and visual cursor position responsive to user input;
 f) Providing force feedback to the user according to the haptic model and the position of the haptic cursor relative to the haptic model; and
 further comprising representing the position of the visual cursor to the user by a cursor graphic overlayed on the two-dimensional image, and further comprising changing the cursor graphic responsive to the position of the haptic cursor relative to the haptic model.

7. The method of claim 6, wherein providing force feedback comprises determining the position of the haptic cursor in the two-dimensional projection of the haptic model corresponding to the two-dimensional image, and establishing the depth relative to that projection of the haptic cursor to be the depth in the haptic space of the part of the haptic model that the haptic cursor first contacts.

8. A method of generating a haptic model corresponding to an object in a visual image, comprising:
 a) Selecting a haptic model from a set of haptic models, wherein the selected haptic model approximates desired haptic aspects of the object;
 b) Establishing a correspondence between features of the selected haptic model and the representation of the object in the image; and
 c) Generating a haptic model from the selected haptic model and the correspondence;

wherein haptic models in the set of haptic models comprise handles, and wherein establishing a correspondence comprises identifying index points in the representation of the object in the image that correspond to the handles of the haptic model.

9. The method of claim 8, wherein the set of haptic models comprises a plurality of haptic models, each associated with a class of objects and each representing a simplified haptic model adaptable to generate haptic models within the haptic perception range of objects within the associated class.

10. The method of claim 8, wherein the image comprises a two-dimensional image.

11. The method of claim 8, wherein the image comprises a two-dimensional image within a sequence of two-dimensional images.

12. The method of claim 8, wherein the handles comprise points of discontinuity in the haptic model.

13. The method of claim 8, wherein the handles comprise points identifying scale of the haptic model.

14. The method of claim 8, wherein the handles comprise points identifying rotation of the haptic model.

15. The method of claim 8, wherein generating a haptic model comprises:
   a) Establishing the location in haptic space of the handles of the selected haptic model from the location in the image of the index points in the representation of the object;
   b) Generating a haptic model from the location in haptic space of the handles and from the selected haptic model.

16. The method of claim 8, wherein generating a haptic model comprises generating a haptic model by adjusting the selected haptic model so that the locations of the handles of the generated haptic model in haptic space correspond to locations of the index points in the representation of the object in the image.

17. The method of claim 16 wherein adjusting the selected haptic model comprises at least one of: scaling the haptic model, positioning the haptic model, rotating the haptic model, stretching the haptic model, twisting the haptic model, and morphing the haptic model.

18. A method of generating a haptic model corresponding to an object in a sequence of visual images, where the images in the sequence comprise images of the object at different sequential times, comprising:
   a) Selecting a haptic model from a set of haptic models, wherein the selected haptic model approximates desired haptic aspects of the object;
   b) Establishing a correspondence between features of the selected haptic model and the representation of the object in a first image in the sequence;
   c) Generating a haptic model for the first image from the selected haptic model and the correspondence; and
   d) Determining the change in the representation of the object in a second image in the sequence; and
   e) Generating a haptic model for the second image from the selected haptic model, the correspondence, and the change.

19. A method of generating a haptic model corresponding to a plurality of objects in a visual image, comprising, for each object in the visual image:
   a) Selecting a haptic model from a set of haptic models, wherein the selected haptic model approximates desired haptic aspects of the object;
   b) Establishing a correspondence between features of the selected haptic model and the representation of the object in the image; and
   c) Generating a haptic model from the selected haptic model and the correspondence;
   wherein generating a haptic model comprises modifying the selected haptic model according to a set of parameterized operations, which parameterized operations include one or more of the following: scale along an axis, and relative scale between parts of the model.

20. A method of generating a three-dimensional haptic component of a human-computer interface corresponding to a two-dimensional image of an object, comprising:
   a) Selecting from a library of haptic models an initial haptic model that is topologically similar to the object;
   b) Establishing correspondence between a set of correspondence points in the three-dimensional initial haptic model and a set of correspondence points in the two-dimensional image of the object;
   c) Determining an error between the two dimensional projection of a haptic model and the two-dimensional image of the object, where the haptic model is determined by applying a set of parameterized operations to the initial haptic model, which parameterized operations include one or more of the following: scale along an axis, and relative scale between parts of the model.
   d) Determining parameters for the parameterized operations that produce a haptic model corresponding to an error within an error bound.

21. A method of providing for interaction with a three-dimensional haptic component of a human-computer interface corresponding to a two-dimensional image, comprising:
   a) Selecting from a library of haptic models a three-dimensional haptic model that is topologically similar to the object;
   b) Establishing a relationship between the two-dimensional image and the three-dimensional haptic model such that interaction with the two-dimensional image is linked to interaction with the three-dimensional haptic model;
   c) Establishing a correspondence between a haptic cursor in a haptic space and a visual cursor in a visual space;
   d) changing the haptic cursor position and visual cursor position responsive to user input;
   e) Providing force feedback to the user according to the haptic model and the position of the haptic cursor relative to the haptic model; and
   further comprising representing the position of the visual cursor to the user by a cursor graphic overlayed on the two-dimensional image, and further comprising changing the cursor graphic responsive to the position of the haptic cursor relative to the haptic model.

22. The method of claim 21 wherein interaction with the two-dimensional image comprises motion of a cursor in a visual representation of the image responsive to user manipulation of an input device, and wherein interaction with the three-dimensional haptic model comprises force fed back to the input device responsive to user manipulation thereof.

23. The method of claim 21 wherein interactions are linked such that forces applied by the user to the three-dimensional haptic model affect the display of the two-dimensional image.

24. The method of claim 21 wherein establishing a relationship comprises establishing a correspondence between the three-dimensional haptic model and the two-dimensional image such that perceptive discrepancy therebetween is minimized.

25. The method of claim 21 wherein establishing a relationship comprises establishing a correspondence between the three-dimensional haptic model and the two-dimensional image such that an error representing the difference between the two-dimensional projection of the haptic model into to plane of the image and the two-dimensional image is minimized.

* * * * *